United States Patent
Wild et al.

(10) Patent No.: US 7,810,541 B2
(45) Date of Patent: Oct. 12, 2010

(54) ANVIL FOR ULTRASONIC WELDING AND DEVICE FOR ULTRASONIC WELDING

(75) Inventors: Hans-Peter Wild, Eppelheim (DE); Eberhard Kraft, Neckarbischofsheim (DE); Frank Lechert, Weinheim (DE)

(73) Assignee: Indag Gesellschaft fur Industriebedarf mbH & Co. Betriebs KG, Eppelheim (DE)

( * ) Notice: Subject to any disclaimer, the term of this patent is extended or adjusted under 35 U.S.C. 154(b) by 453 days.

(21) Appl. No.: 11/747,611

(22) Filed: May 11, 2007

(65) Prior Publication Data
US 2008/0105385 A1    May 8, 2008

(51) Int. Cl.
B32B 37/00    (2006.01)

(52) U.S. Cl. ................. 156/580.2; 156/580.1

(58) Field of Classification Search ........... 156/73.1, 156/580.1, 580.2; 425/174.2; 264/442, 443, 264/445
See application file for complete search history.

(56) References Cited

U.S. PATENT DOCUMENTS 2,834,395 A    12/1954   Russell et al.
5,653,832 A *  8/1997   Thompson et al. ......... 156/73.1
6,313,440 B1   11/2001  Weber et al.

FOREIGN PATENT DOCUMENTS

| FR | 2 829 962 | 3/2003 |
| JP | 52-125540 | 10/1977 |
| JP | 56-058822 | 5/1981 |
| WO | WO 2006/041380 A1 | 4/2006 |

OTHER PUBLICATIONS

International Search Report in International Patent Application No. EP 06 00 9789, dated Sep. 22, 2006.

* cited by examiner

Primary Examiner—James Sells
(74) Attorney, Agent, or Firm—Stroock & Stroock & Lavan LLP

(57) ABSTRACT

An ultrasonic welding apparatus is provided having an anvil preferably connected to a lever assembly. The lever assembly is preferably connected to a carrier via a holder, wherein the holder is pivotable with respect to the carrier, and the lever assembly is pivotable with respect to the holder. An urging device may also be provided to urge the anvil toward an ultrasonic hammer, more preferably away from the carrier.

18 Claims, 3 Drawing Sheets

ANVIL FOR ULTRASONIC WELDING AND DEVICE FOR ULTRASONIC WELDING

BACKGROUND OF THE INVENTION

This invention relates, in general, to an apparatus for ultrasonic welding, more specifically for ultrasonic welding of a material such as a plastic bag. Such an apparatus may be used to close or seal a plastic bag after the bag has been filled with a product.

In light of shortcomings described above, it is desirable to provide an apparatus and method of withdrawing a quantity of a product from a product stream wherein sterilization of the apparatus and/or product is facilitated.

SUMMARY

Generally speaking, the present invention is directed toward an apparatus for ultrasonic welding of a material. For example, an embodiment of the apparatus may include a welding assembly comprising an anvil urged toward an ultrasonic hammer, the anvil being connected to a pair of levers. The levers are preferably parallel with respect to each other and are connected via one or more connecting elements, at least one of which may be connected to, preferably mounted on, a holder. The anvil is preferably maintained on the same plane while it is in both the rest position as well as the welding position.

Accordingly, it is an object of the invention to provide an apparatus and a method for ultrasonic welding of a material wherein the anvil and ultrasonic hammer contact the material at a smooth, even surface.

It is further an object of the invention to provide an apparatus and a method for ultrasonic welding of a material wherein the anvil and ultrasonic hammer provide a uniform pressure on the material where the ultrasonic hammer and the anvil contact the material.

It is also an object of the invention to provide an apparatus and a method for ultrasonic welding of a material wherein the anvil does not pivot.

Another object of the invention is to provide an apparatus and a method for ultrasonic welding of a material wherein either or both the anvil and ultrasonic hammer are displaced toward each other to contact the material.

Yet another object of the invention is to provide an apparatus for ultrasonic welding of a material wherein the anvil is suspended parallel levers to provide a defined rest position.

It is another object of the invention to provide an apparatus for ultrasonic welding of a material wherein a plurality of weld locations may be welded simultaneously.

Other objects and features of the present invention will become apparent from the following detailed description, considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE FIGURES

For a fuller understanding of the invention, reference is had to the following description, taken in connection with the accompanying drawings, in which.

DETAILED DESCRIPTION

Figure 1:
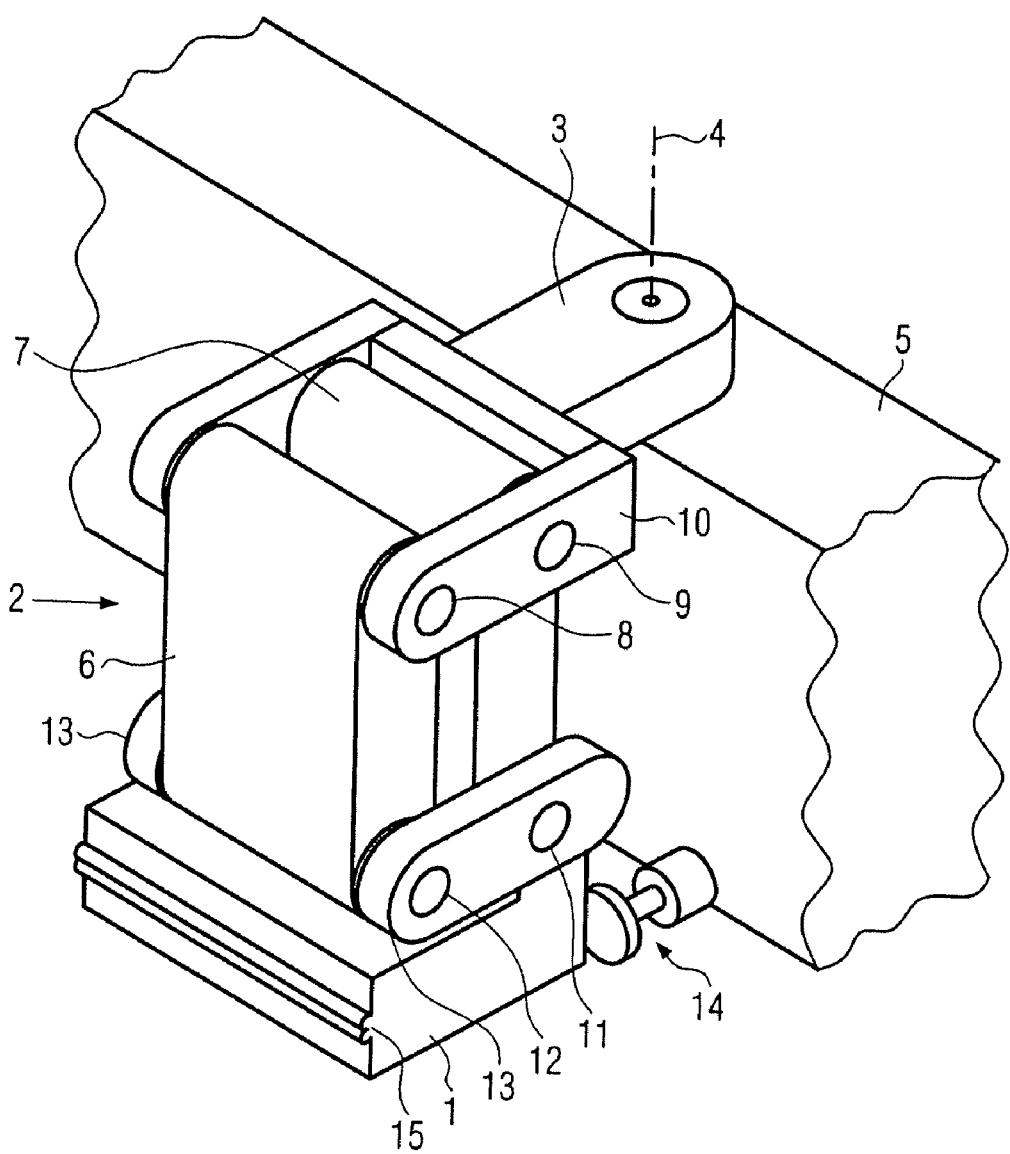
FIG. 1 is a perspective view of a welding assembly in accordance with an embodiment of the invention.
Figure 2:
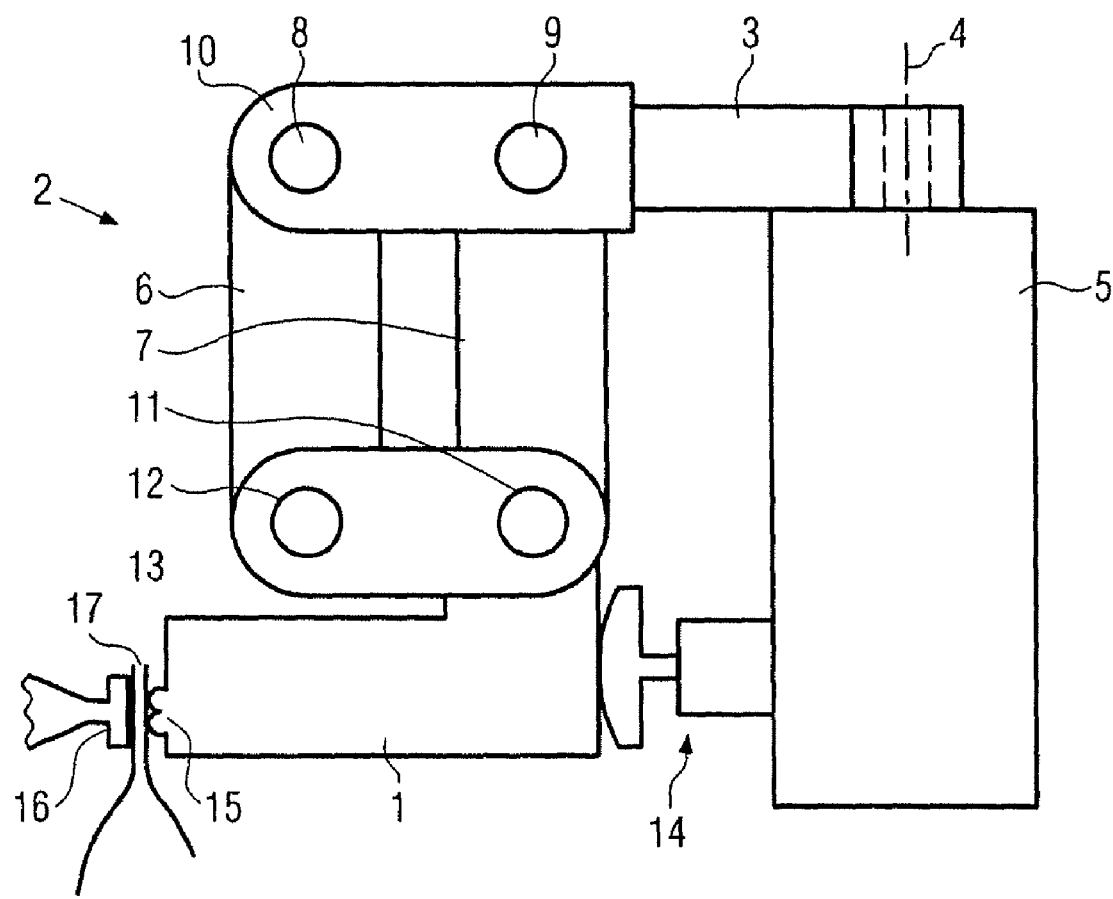
FIG. 2 is a cross-sectional view of a welding assembly in accordance with an embodiment of the invention.
Figure 3:
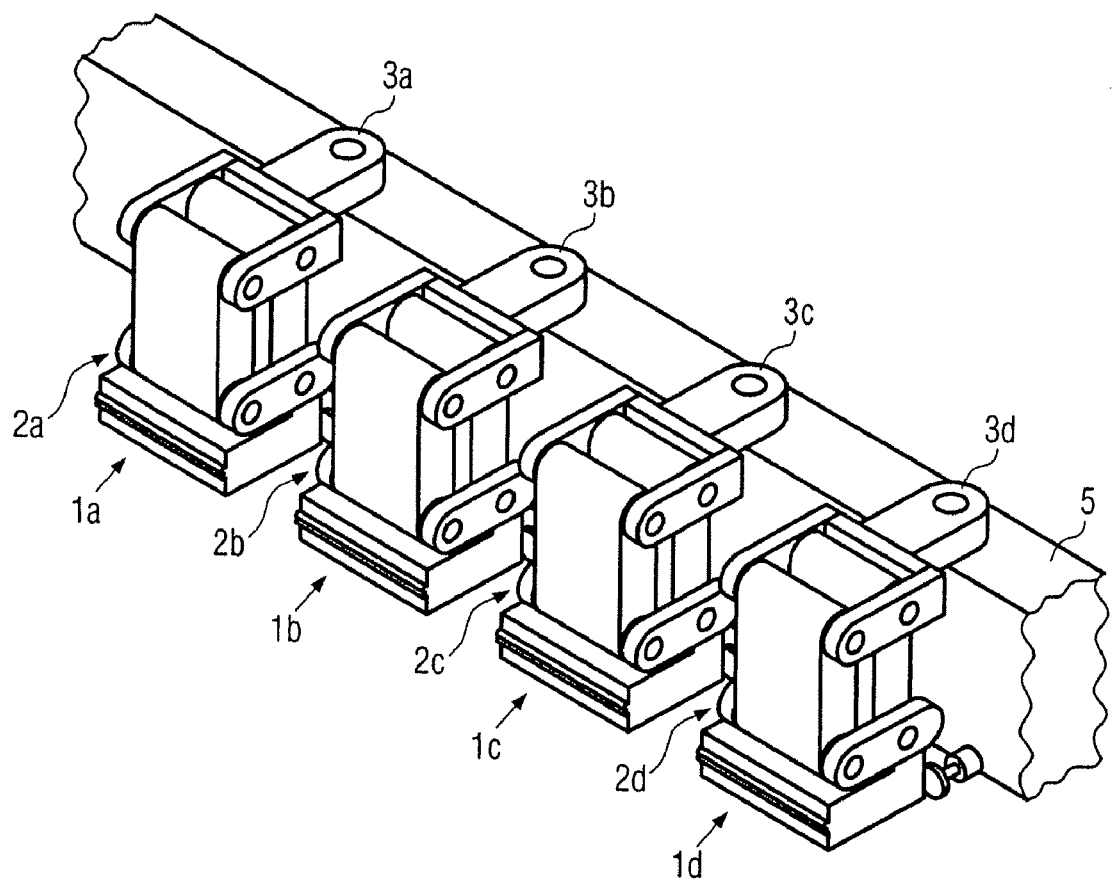
FIG. 3 is a perspective view of a system having a plurality of welding assemblies in accordance with an embodiment of the invention.

Reference is made to FIGS. 1-3, wherein a welding assembly constructed and arranged according to an embodiment of the invention is illustrated. In the embodiment shown, the assembly may include an anvil 1 constructed and arranged to contact a material 17 at a first side whereas a counter assembly, preferably comprising an ultrasonic hammer 16, may contact the material 17 at a second side. The material may be a part of a plastic bag, a foil bag, etc. that can be welded, preferably welded shut. For example, a bag can be filled with a product and welded shut by anvil 1 and ultrasonic hammer 16.

One exemplary embodiment of a welding assembly as shown in FIGS. 1-2 may include a first lever 7 preferably positioned at an angle substantially perpendicular to anvil 1. The welding assembly may also include a second lever 6 positioned substantially parallel to first lever 7. In accordance with the embodiment shown, a first connecting element 10 is operatively connected to both first lever 7 and second lever 6. Preferably, first lever 7 and second lever 6 are pivotably connected to first connecting element 10 via first and second axles 8, 9. A second connecting element 13 may also be connected to both first lever 7 and second lever 6, preferably via third and fourth axles 11, 12. Preferably, second connecting element 13 is operatively connected to anvil 1, and first connecting element 10 is operatively connected to a holder 3. Holder 3 is preferably connected to a carrier 5, more preferably mounted on carrier 5, via a carrier axle 4. In accordance with the embodiment shown, first connecting element 10 and holder 3 may be substantially parallel to anvil 1 and substantially perpendicular to first lever 7 and second lever 6.

In accordance with an exemplary embodiment of the invention shown, anvil 1 includes lips 15 facing ultrasonic hammer 16. Lips 15 of anvil 1 contacts material 17 when in the welding position. Preferably each lip 15 creates a single weld. For example, the two lips 15 preferably create two parallel welded seams across material 17. However, one of ordinary skill in the art would understand that two or more lips 15 may be utilized to create a single welded seam without deviating from the scope of the invention. In accordance with a preferred embodiment of the welding assembly, lips 15 are fixed on anvil 1 such that the deflection of anvil 1 would not affect the positions of lips 15 thereon. Such an arrangement may be beneficial in producing well sealed welded seams.

Moreover, the force applied between lips 15 and ultrasonic hammer 16 are preferably substantially equal. Therefore, the wear rate of lips 15 may be substantially equal, for example, by providing substantially equal frictional force between each lip 15 and ultrasonic hammer 16. Such an arrangement may improve tool life. Additionally, whereas the embodiment shown includes two lips 15, it is to be understood that anvil 1 may include a single lip or any other number of lips according to application specific design choice.

Preferably, a welding assembly includes an urging mechanism 14. Referring to FIG. 2, an embodiment of urging mechanism 14 may contact anvil 1, preferably on the opposite side from lips 15. Urging mechanism 14 may contact anvil 1 directly or indirectly via first lever 7 or another alternate member. Preferably, urging mechanism 14 is connected to carrier 5 and urges anvil 1 away from carrier 5, more preferably toward ultrasonic hammer 16. For example, urging mechanism 14 may have a spring and/or a damping effect.

Urging mechanism 14 may include a piston constructed and arranged to press against anvil 1 utilizing compressed air, a spring, an elastic element or other force as a matter of application specific design choice.

Anvil 1 may also be urged toward ultrasonic hammer 16 by another urging device in place of or in combination with urging mechanism 14. In accordance with another embodiment of the welding assembly, first lever 7 or second lever 6, collectively levers 2, may include a moving part which may be urged by urging mechanism 14 or an urging device to dampen the movement of levers 2 and thus anvil 1.

The dampening effect may be preferable for example, when welding materials at high speeds. More specifically, it may be preferable to provide a controlled pressure between ultrasonic hammer 16 and anvil 1, more preferably uniform pressure relatively quickly. In accordance with an exemplary embodiment, a plurality of urging mechanisms 14 may be provided. For example, two urging mechanisms 14 may be provided for each anvil 1, preferably at opposite ends thereof.

In accordance with one embodiment of the urging mechanism 14, urging mechanism 14 may be constructed and arranged to urge anvil 1 in a limited manner. For example, a maximum deflection distance may be predetermined to prevent anvil from being displaced more than desired. By way of non-limiting example, a limiting element may be provided to apply a force on levers 2 or anvil 1 toward urging mechanism 14. The combination of urging mechanism 14 and limiting element may move or maintain anvil 1 in a predetermined position. Preferably the force provided by the limiting element is less than the pressure provided by urging mechanism 14.

An example of a process of creating a welding seam on a container in accordance with an embodiment of the invention will be described herein. Referring to FIG. 2, ultrasonic hammer 16 can be moved away from anvil 1 to receive a material 17 of a foil bag therebetween. Ultrasonic hammer 16 can be moved toward anvil 1, thus clamping material 17 therebetween. Preferably, anvil 1 is pushed toward urging mechanism 14 until anvil 1 is slight displaced. The displacement of anvil 1 is preferably limited by the urging force applied by urging mechanism 14. More preferably, a controlled pressure between ultrasonic hammer 16 and anvil 14 may be provided.

In accordance with an exemplary embodiment of the invention, carrier 5 may be constructed and arranged to be movable to permit anvil 1 to be moved toward or away from ultrasonic hammer 16. If carrier 5 permits anvil 1 to be moved away from ultrasonic hammer 16, a gap may be provided between the ultrasonic hammer 16 and anvil 14 to receive a material 17 therebetween. Carrier 5 may then move toward ultrasonic hammer 16 to clamp material 17 between ultrasonic hammer 16 and anvil 1.

FIG. 3 illustrates an embodiment of the invention wherein a plurality of welding assemblies is arranged, preferably along the length of carrier 5. Preferably each welding assembly includes anvils 1a, 1b, 1c, 1d operatively connected to levers 2a, 2b, 2c, 2d. Such an arrangement may provide multiple welding processes simultaneously, more specifically, a plurality of bags may be welded, one at each welding assembly. Preferably, this embodiment may enhance efficiency by permitting a plurality of bags to be welded simultaneously. In accordance with the embodiment shown, each welding assembly is mounted on carrier 5 independently of each other via holders 3a, 3b, 3c, 3d. Therefore, each anvil 1a, 1b, 1c, 1d may orientate individually via levers 2a, 2b, 2c, 2d and the pivoting movement of holders 3a, 3b, 3c, 3d, while preferably providing a compact design.

Preferably, a separate ultrasonic hammer engages each anvil. However, a common ultrasonic hammer may be provided to engage more than one anvil without deviating from the scope of the invention.

The materials, such as bags, to be welded may be provided by moving a plurality of bags along the length of carrier 5 or in a direction perpendicular to it.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. An apparatus for ultrasonic welding, the apparatus comprising:
    an ultrasonic hammer;
    an anvil, the anvil being selectively displaceable toward the ultrasonic hammer;
    a holder;
    a first lever operatively connected to the anvil;
    a second lever operatively connected to the holder;
    a lever assembly to position the first lever and second lever parallel to each other during displacement of the anvil, the lever assembly including:
        a first connector operatively connected to the first lever and second lever; and
        a second connector operatively connected to the first lever and second lever; and
    an urging device constructed and arranged to urge the anvil toward the ultrasonic hammer.

2. The apparatus of claim 1, wherein the lever assembly is constructed and arranged to suspend the anvil.

3. The apparatus of claim 1, further comprising an axle, wherein the lever assembly is selectively pivotable about the axle with respect to the holder.

4. The apparatus of claim 3, wherein the lever assembly further includes at least one lever axle, wherein at least one of the first and second levers is selectively pivotable about at least one lever axle, the axle being substantially perpendicular to at least one lever axle.

5. The apparatus of claim 1, wherein the urging device includes at least one of a spring, an elastic element, a rubber element, and/or compressed air springs.

6. The apparatus of claim 1, further comprising a damping device constructed and arranged to damp the movement of the anvil.

7. The apparatus of claim 1, wherein the apparatus includes a plurality of anvils and a plurality of ultrasonic hammers.

8. The apparatus of claim 1, wherein the apparatus includes a plurality of anvils positioned adjacent to one another.

9. The apparatus of claim 1, wherein the apparatus includes a plurality of anvils and a plurality of lever assemblies, each lever assembly being connected to one of the plurality of anvils.

10. The apparatus of claim 1, wherein the apparatus includes:

a plurality of holders;

a plurality of lever assemblies, each lever assembly being connected to one of the holders; and at least one carrier connected to at least one of the holders.

11. The apparatus of claim 1, wherein the apparatus is constructed and arranged to weld a film material.

12. The apparatus of claim 1, wherein the apparatus is constructed and arranged to weld a compound film material.

13. The apparatus of claim 1, wherein the apparatus is constructed and arranged to weld filled plastic bags.

14. The apparatus of claim 1, wherein the apparatus is constructed and arranged to weld a plastic bag proximate a filling station for the plastic bag.

15. The apparatus of claim 1 further comprising a carrier, wherein the holder connects at least one of the first and second levers to the carrier.

16. The apparatus of claim 1, wherein the first lever and the second levers are pivotable with respect to at least one of the first connector and second connector.

17. The apparatus of claim 1 further comprising a carrier, wherein the anvil is operatively connected to the carrier and the urging device urges the anvil away from the carrier.

18. The apparatus of claim 1 wherein the lever assembly further includes at least one lever axle, wherein the at least one of the first and second levers is selectively pivotable about the at least one lever axle.

\* \* \* \* \*